United States Patent
Miyata

(10) Patent No.: US 6,642,509 B2
(45) Date of Patent: Nov. 4, 2003

(54) LINEAR SCALE MEASURING DEVICE AND POSITION DETECTION METHOD USING THE SAME

(75) Inventor: Toshiharu Miyata, Kawasaki (JP)

(73) Assignee: Mitutoyo Corporation, Kawasaki (JP)

(*) Notice: Subject to any disclaimer, the term of this patent is extended or adjusted under 35 U.S.C. 154(b) by 0 days.

(21) Appl. No.: 10/329,408

(22) Filed: Dec. 27, 2002

(65) Prior Publication Data
US 2003/0089844 A1 May 15, 2003

Related U.S. Application Data

(62) Division of application No. 09/597,590, filed on Jun. 20, 2000, now Pat. No. 6,521,885.

(30) Foreign Application Priority Data

Jun. 24, 1999 (JP) .............................................. 11-178675

(51) Int. Cl.[7] ................................................. G01D 5/34
(52) U.S. Cl. ............................... 250/231.13; 256/231.16
(58) Field of Search ..................... 250/231.13, 231.14, 250/231.16, 231.18, 237 G; 356/614, 616, 617, 618, 619; 341/13, 31; 33/706, 707

(56) References Cited

U.S. PATENT DOCUMENTS

| 4,733,071 A | | 3/1988 | Tokunaga ............... 250/231.16 |
| 5,124,548 A | * | 6/1992 | Igaki ...................... 250/231.16 |

FOREIGN PATENT DOCUMENTS

| EP | 0 021 451 A1 | 1/1981 |
| EP | 0 555 507 A1 | 8/1993 |
| EP | 0 579 586 A1 | 1/1994 |
| JP | 1-174916 | 7/1989 |
| JP | 5-40045 | 2/1993 |
| JP | 43 06 634 A1 | 2/1993 |

* cited by examiner

Primary Examiner—Kevin Pyo
(74) Attorney, Agent, or Firm—Oliff & Berridge, PLC

(57) ABSTRACT

A linear scale type measuring device capable of canceling an error caused by inclination of an encoder, a moire error, is disclosed. A linear encoder disposed relative to a scale includes two sensors A and B which are arranged such that they are inclined at a predetermined angle θ with regard to the scale. At the time of measurement, a detection value corresponding to that with no inclination can be obtained by an operation based on detection values from the sensors A and B, and the known angle θ, even when the encoder is further inclined by any angle δ.

3 Claims, 4 Drawing Sheets

LINEAR SCALE MEASURING DEVICE AND POSITION DETECTION METHOD USING THE SAME

This is a division of application Ser. No. 09/597,590, filed Jun. 20, 2000, and now U.S. Pat. No. 6,521,885.

BACKGROUND OF THE INVENTION

1. Field of the Invention

The present invention relates to a linear scale measuring device, and more particularly to a device employing cancellation of a moire error, and to a position detection method employing this measuring device.

2. Description of Related Art

A linear scale measuring device typically comprises a scale and a linear encoder. The scale is fixed to a mechanical part or device, for example, while the linear encoder is mounted to a movable portion of the device, such that a distance from a reference position or the like is measured.

For such a linear scale type measuring device to perform accurate measurement, the linear encoder must be appropriately positioned relative to the scale. A linear encoder which is inappropriately inclined with regard to the scale produces error, especially moire error.

For detecting an absolute position using such a measuring device, on the other hand, more than one scales must be simultaneously employed, because, with only one scale, it is not possible to specify which integral multiple of corresponds to the lattice pitch formed on the scale the detected position.

FIG. 3 is a conceptual structural view of a linear scale type measuring device for use in absolute position detection. Referring to FIG. 3, a plurality of scales 10$a$ and 10$b$ are disposed in parallel, and relative to these a linear encoder 12 is disposed. The linear encoder 12 includes therein a sensor 1 for detecting a position relative to the scale 10$a$ and a sensor 2 for detecting a position relative to the scale l0b.

Each of the sensors 1 and 2 comprises four detecting elements which are arranged at intervals of $\lambda/4$ with regard to a wavelength $\lambda$ of each scale. Specifically, assuming that wavelengths of the scales 10$a$ and 10$b$ are set to $\lambda 1$ and $\lambda 2$, respectively, the four detecting elements of each sensor 1 and 2 are disposed at intervals of $\lambda 1/4$ and $\lambda 2/4$, respectively. When the linear encoder 1 moves, a detection signal is output from each detecting element of the sensor 1. Because the detecting elements are each provided with a displacement of $\lambda 1/4$ from the adjacent element, the phases of the detection signals are also shifted by $\lambda 1/4$. Assume that the phase of the detecting element at the left end (first element) is a reference phase, for example, the phase of the detecting element (second element) adjacent to the first element is shifted by 90°, the phase of the detecting element (third element) adjacent to the second element is shifted by 180°, and the phase of the detecting element at the right end (fourth element) is shifted by 270°, respectively, from the reference phase. Accordingly, provided that detecting signals from the first and third elements are detecting signals in the x direction while detecting signals from the second and fourth elements are detecting signals in the y direction, a phase difference is detected by the following expression.

$$\theta 1 = arc\ \tan(y/x) \quad (1)$$

The phase difference is then converted into a distance and a position relative to the scale 10$a$ can be obtained by the following expression.

$$X1 = \theta 1/2\pi \cdot \lambda 1 \quad (2)$$

Similarly, the position relative to the scale 10$b$ can be obtained with the sensor 2 by the following expression.

$$X2 = \theta 2/2\pi \cdot \lambda 2 \quad (3)$$

Since the reference points for the scales 10$a$ and 10$b$ coincide with each other, the absolute position with regard to such a reference point can be detected based on the above X1 and X2.

As described above, detection of an absolute position is possible when the linear encoder 12 is precisely positioned relative to the scales 10$a$ and 10$b$. However, when the linear encoder 12 rotates about the center C and is inclined relative to the scales 10$a$ and 10$b$ as shown in FIG. 4, the detection values X1 and X2 from the sensors 1 and 2 are no longer accurate and this causes an error, specifically a moire error, to be included in the absolute position detected from X1 and X2.

In order to prevent such a moire error, a technique has been proposed in which a third scale which is the same as either of the scale 10$a$ or 10$b$ is further disposed in a symmetrical manner with regard to the center C, such that the detected values for the two same scales are averaged to cancel the moire error. This technique, however, requires 2n−1 scales for n scales and therefore the size of an entire device increases, making downsizing difficult.

It is also possible to provide a moire angle sensor within the encoder for detecting angle data, which is then used to correct the detection values using a software such as a microcomputer. This technique, which requires a separate sensor, also suffers from the problem that it makes downsizing difficult.

SUMMARY OF THE INVENTION

The present invention has been made in view of the foregoing problems of the related art, and aims to provide a measuring device and a position detection method capable of accurate measurement with a simple structure while preventing a moire error.

To this end, a linear scale type measuring device according to one aspect of the invention comprises a scale, and a linear encoder which is disposed relative to said scale includes a plurality of sensors with regard to said scale, the plurality of sensors being collinearly arranged such that the array of sensors is inclined at a predetermined angle with respect to the longitudinal direction of said scale. The linear scale type measuring device of the present invention further comprises operation means for calculating a detection phase of said linear encoder based on phases detected by said plurality of sensors and said predetermined angle. When two sensors are employed, and providing that phases detected by the two sensors are $\Phi A$, and $\Phi B$, respectively, the initial phases of the two sensors are $\Phi A0$, and $\Phi B0$, respectively, said predetermined angle is $\theta$, a wavelength of said scale is $\lambda$, and a distance between the rotation center of the sensors and the center point between the two sensors when the sensors are inclined by the predetermined angle $\theta$ is L, the operation means may calculate the detection phase of said linear encoder, in other words, the detection phase equal to that when the two sensors are not inclined with respect to the scale, using the following expression.

$$\Phi = (\Phi A + \Phi B)/2 - 2\pi/\lambda \cdot L\{\sin\theta + (\Phi A0 - \Phi B0 - \Phi A + \Phi B)/4\pi \sin\theta \cdot \cos\theta\} \quad (4)$$

The detection phase can be converted into a distance, such that the position of the linear encoder with respect to the reference position of the scale can be obtained.

In order to detect the phase of each of the plurality of sensors, each of the plurality of sensors may, for example, comprise a plurality of sensor elements disposed at predetermined intervals, e.g. ¼ of the scale wavelength. Any number of sensor elements may be provided.

A linear scale type measuring device according to another aspect of the present invention comprises a pair of scales; a linear encoder disposed relative to said pair of scales; and an operation unit for detecting the position of said linear encoder relative to said pair of scales based on an output from said linear encoder, wherein said linear encoder includes a plurality of sensors with regard to each of said pair of scales, said plurality of sensors being previously arranged such that they are inclined at a known angle with respect to the measuring direction of said scales, and wherein said operation unit detects the position of said linear encoder resulting from the inclination of said plurality of sensors with regard to the measuring direction of the scales, based on detection signals from said plurality of sensors and said known angle which is previously set. The position of the encoder resulting from the inclination of the sensors is accurately detected for each of said pair of scales, such that the absolute position of the linear encoder from the reference position can be obtained.

According to still another aspect of the present invention, there is provided a method of detecting a position using a linear scale type measuring device comprising a scale and a linear encoder. The method comprises the steps of (a) inclining a plurality of sensors arranged collinearly within said linear encoder at a predetermined angle with respect to said scale; (b) detecting each phase of said plurality of sensors using respective of said plurality of sensors; and (c) calculating a detection phase of said linear encoder based on the detected phases, said predetermined angle, and initial phases of said plurality of sensors. The detection phase may be obtained using the above expression.

BRIEF DESCRIPTION OF THE DRAWINGS

These and other objects of the invention will be explained in the description below, in connection with the accompanying drawings, in which.

DETAILED DESCRIPTION OF THE PREFERRED EMBODIMENT

A preferred embodiment of the present invention will be described in further detail with reference to the accompanying drawings.

Figure 1A:
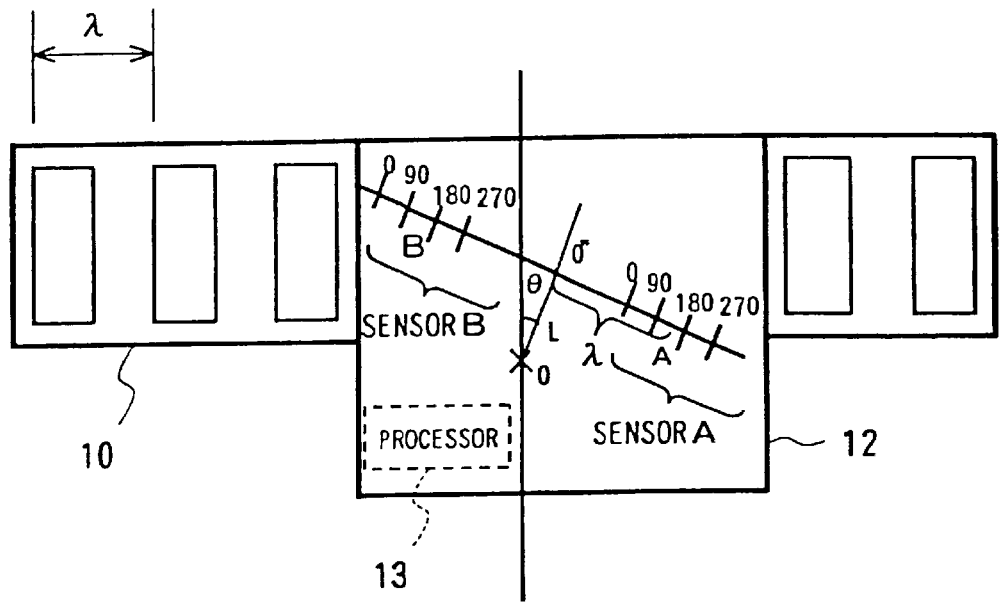
FIG. 1(a) is a view showing one exemplary scale portion of a structure of a linear scale type measuring device according to an embodiment of the invention.
Figure 1B:
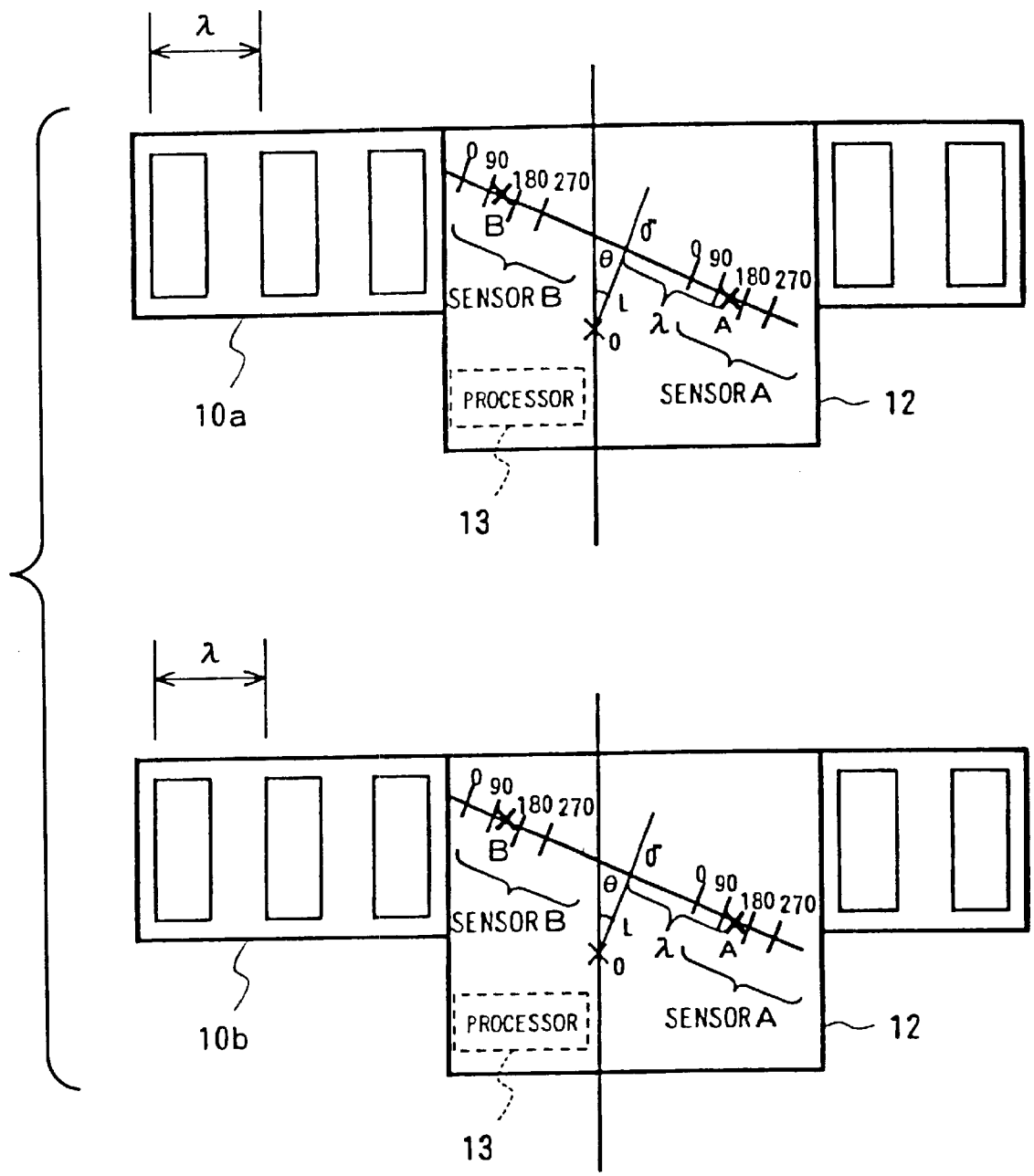
FIG. 1(b) is a view showing a structure of a linear scale type measuring device according to an embodiment of the invention.
Figure 5:
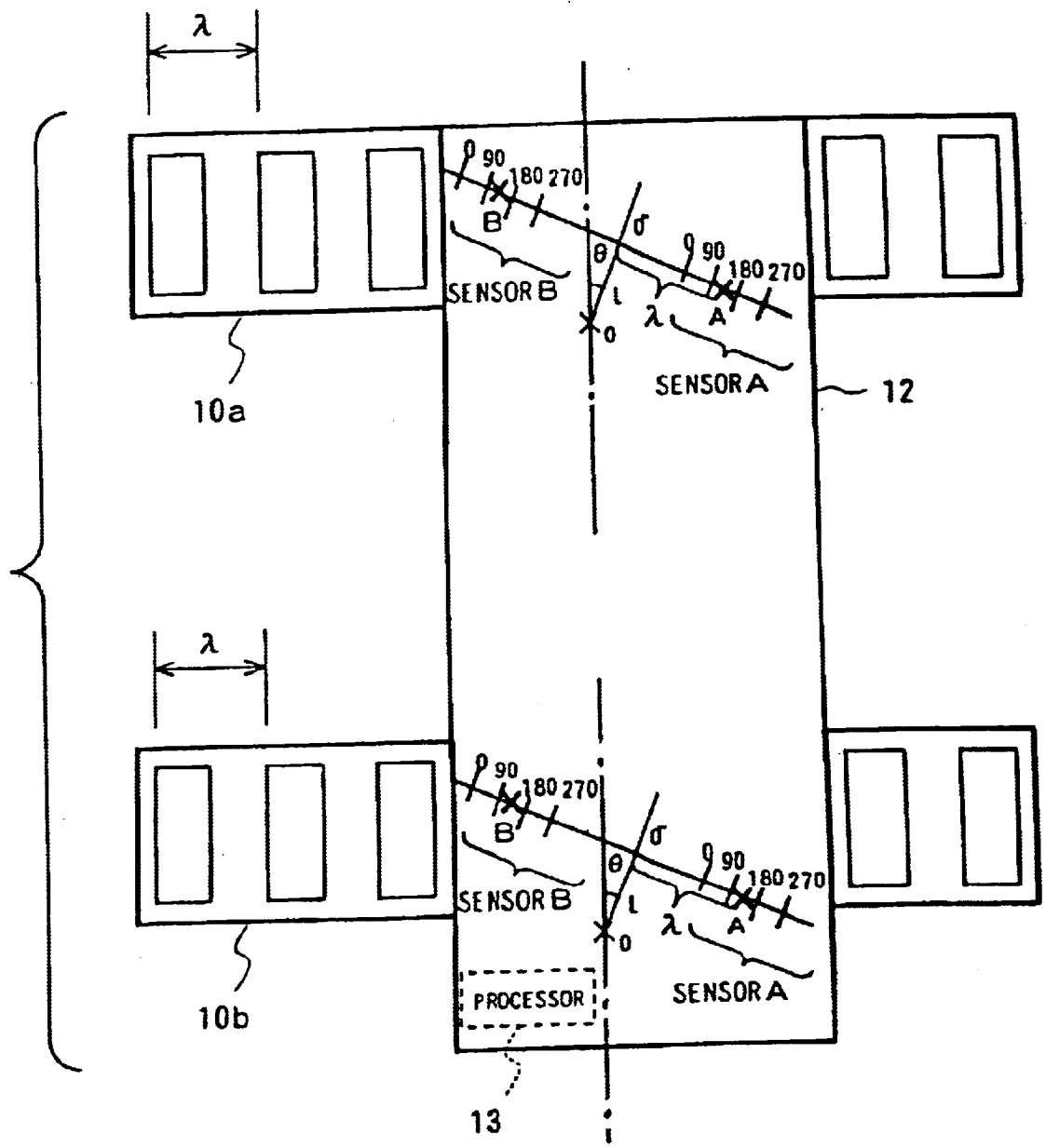
FIG. 5 is a view showing another structure of a linear scale type measuring device according to another aspect of the present invention.

FIGS. 1(a) and 1(b) depict a structure of a linear scale type measuring device according to an embodiment of the present invention. Although a pair of scales (see FIGS. 1(b) and 5 for example) are actually necessary to detect an absolute position, one exemplary scale portion, which has the same structure of the other scale portion, is shown separately in FIG. 1(a) for convenience of explanation.

Figure 3:
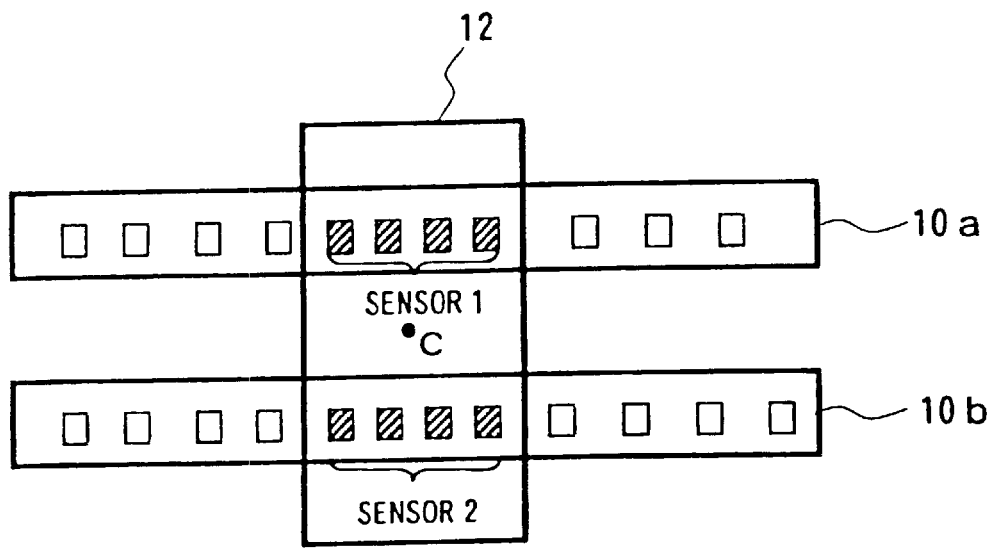
FIG. 3 is a view showing a structure of a linear scale type measuring device according to a related art.
Figure 4:
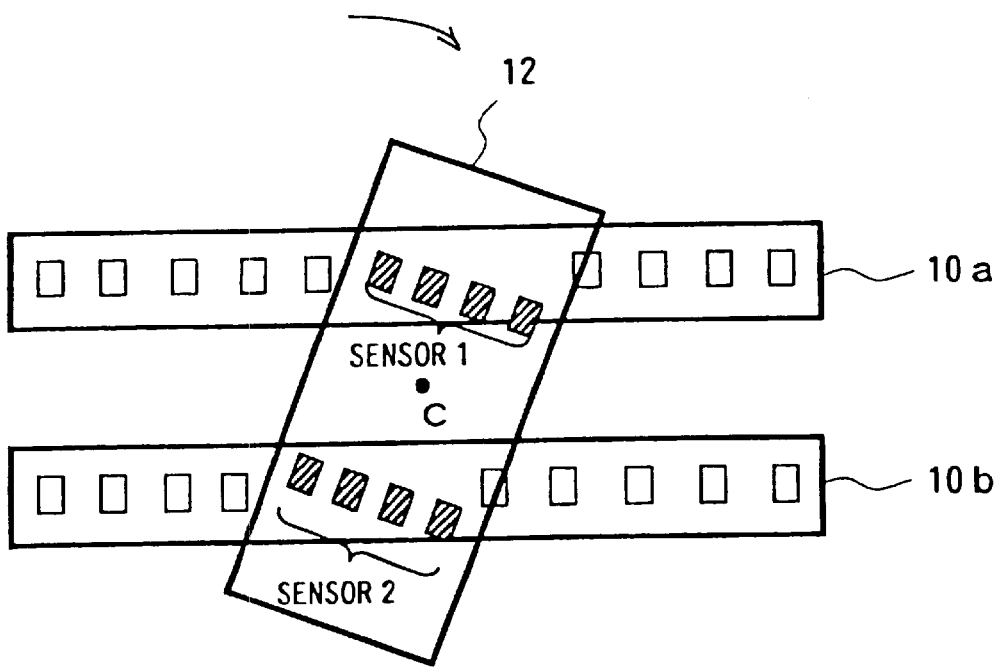
FIG. 4 is a view for explaining a moire error in the structure of FIG. 3.

A linear encoder 12 is disposed relative to a scale 10, and includes two sensors A and B. In contrast with a conventional linear encoder including one sensor with regard to one scale (see FIG. 3 or 4), the two sensors A and B are provided with regard to one scale 10 in this embodiment. Each of the sensors A and B comprises four detection elements which are arranged along one direction (i.e. the longitudinal direction of the scale). Provided that the lattice pitch of the scale 10 is $\lambda$, each interval between adjacent elements of said four detection elements is set to $\lambda/4$. Thus, detection signals from the respective four detection elements in each sensor A, B have phases which are shifted by 0°, 90°, 180°, and 270°, respectively. The center position of each of the sensors A and B (indicated by points A and B, respectively in FIG. 1(a)) is positioned at a distance r (which is equal to the wavelength $\lambda$) from the center point of the line connecting the sensors A and B at each side.

As shown in FIG. 1(a), the sensors A and B are rotated clockwise about the point O so that they are inclined at an angle $\theta$ with respect to the scale 10. As a result, the center point of the line connecting the sensors A and B is moved to the point O" in the figure. The distance between O" and the rotation center O is L.

Thus, according to this embodiment, two sensors which are previously arranged so as to be inclined at an angle $\theta$ are provided with respect to one scale 10, such that a moire error is prevented, namely accurate position detection without moire error can be performed.

The principle of position detection according to this embodiment will be described with reference to FIG. 2, which is an explanatory view of a main portion of FIG. 1(a). When the sensors A and B rotate about the detection center O of the linear encoder by an angle $\theta$, the positions of the detection centers a and b of the sensors A and B, respectively, in the x direction (longitudinal direction of the scale) move by amounts $\Delta A$ and $\Delta B$, respectively, from their positions before rotation.

$$\Delta A = r(\cos\theta - 1) + L \sin\theta \tag{5}$$

$$\Delta B = r(1 - \cos\theta) + L \sin\theta \tag{6}$$

When the phase of the sensor A at angle $\theta$ is set to $\Phi_{AO}$ while the phase of the sensor B at angle $\theta$ is set to $\Phi_{BO}$, the phase shift of the sensors A and B due to the above movement is obtained from the foregoing expressions (5) and (6) as follows:

$$\begin{aligned}\Delta\theta &= \Phi_{AO} - \Phi_{BO} \\ &= 2r(\cos\theta - 1)\cdot 2\pi/r \\ &= 4\pi(\cos\theta - 1)\end{aligned} \tag{7}$$

When the angle $\theta$ changes to $\theta+\delta$, the shift amount of the sensors A and B due to this angle change is as follows:

$$\Delta_{\theta+\delta} = 4\pi(\cos\theta \cos\delta - \sin\theta \sin\delta - 1) \tag{8}$$

If $\theta \gg \delta$, approximation of $\sin\delta = \delta$ and $\cos\delta = 1$ is possible, and therefore the above expression (8) is as follows:

$$\Delta_{\theta+\delta} = 4\pi(\cos\theta - \delta\sin\theta - 1) \qquad (9)$$
$$= \Delta_\theta - 4\pi\delta\sin\theta$$

Because the expression (7) is used to obtain the expression (9), the following expression can be provided from the expression (9).

$$\delta=(\Delta_\theta-\Delta_{\theta+\delta})/4\pi\sin\theta \qquad (10)$$

Figure 2:
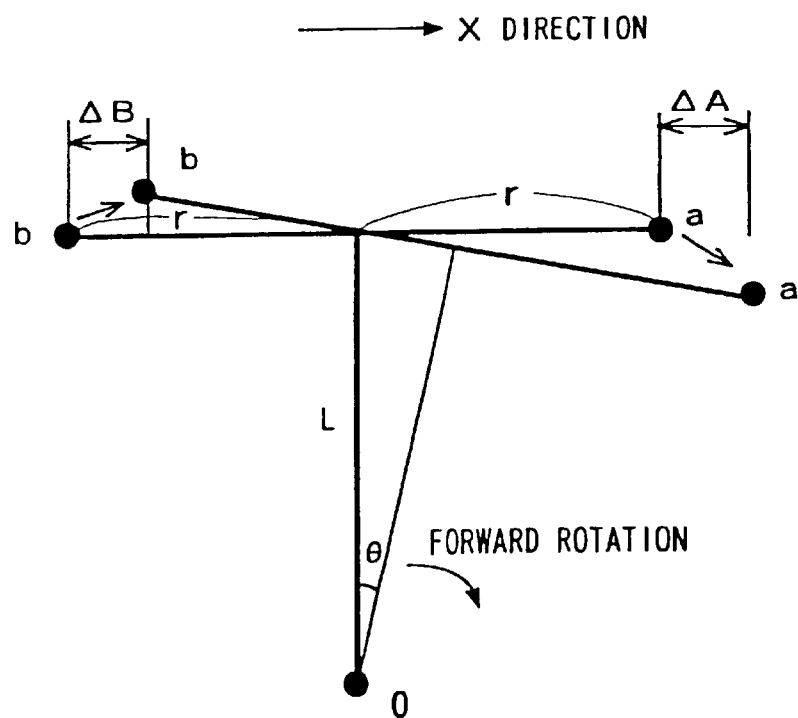
FIG. 2 is an explanatory view of the linear scale type measuring device of FIG. 1.

On the other hand, providing that the phases of the sensors A and B are $\Phi A$ and $\Phi B$, respectively, the phase at the point O", namely the center point of the sensors A and B, from FIG. 2, is as follows:

$$\Phi_{O''}=(\Phi A+\Phi B)/2 \qquad (11)$$

From FIG. 2, the phase of the linear encoder 12 at the detection center O is as follows:

$$\Phi_O=\Phi_{O''}-2\pi/r\cdot L\sin\theta \qquad (12)$$

When the phases of the sensors A and B when the angle $\theta$ changes to $\theta+\delta$ are $\Phi_{A\delta}$ and $\Phi_{B\delta}$ respectively, $\Phi_{O''}$ changes as follows:

$$\Phi_{O''\delta}=(\Phi_{A\delta}+\Phi_{B\delta})/2 \qquad (13)$$

Then, the expression (12) is as follows:

$$\Phi_o = \Phi_{o''\delta} - 2\pi/r\cdot L\sin(\theta+\delta) \qquad (14)$$
$$= (\Phi_{A\delta}+\Phi_{B\delta})/2 - 2\pi/r\cdot L(\sin\theta+\delta\cos\theta)$$

Here, since $\delta$ is calculated from the expression (10) and in the expression (10), $$\Delta_\theta=\Phi_{AO}+\Phi_{BO} \qquad (15)$$

and $$\Delta_{\theta+\delta}=\Phi_{A\delta}-\Phi_{B\delta} \qquad (16),$$

the expression (14) can finally be expresses as $$\Phi_O=(\Phi_{A\delta}+\Phi_{B\delta})/2-2\pi/\lambda\cdot L\{\sin\theta+(\Phi_{AO}-\Phi_{BO}-\Phi_{A\delta}+\Phi_{B\delta})/4\pi\sin\theta\cdot\cos\theta\} \qquad (17)$$

When the wavelength $\lambda$ of the scale 10 is used, $$\Phi_O=(\Phi_{A\delta}+\Phi_{B\delta})/2-2\pi/\lambda\cdot L\{\sin\theta+(\Phi_{AO}-\Phi_{BO}-\Phi_{A\delta}+\Phi_{B\delta})/4\pi\sin\theta\cdot\cos\theta\} \qquad (18)$$

can be obtained.

The above expression (17) or (18) indicates the following. The phases of the sensors A and B which are previously inclined by an angle $\theta$ are detected (at this time, due to movement of the linear encoder 12, the angle $\theta$ slightly varies by an amount of a moire angle $\delta$, namely to $\theta+\delta$), and the predetermined angle $\theta$, the phase of the sensor A at the angle $\theta$ (the initial set phase) $\Phi_{AO}$, and the phase of the sensor B at the angle $\theta$ (the initial set phase) $\Phi_{BO}$ are used, such that the phase $\Phi_O$ at the detection center of the linear encoder, namely the position in the x direction which corresponds to that when the linear encoder is not inclined, can be accurately detected, even when the linear encoder is inclined by any angle from the angle $\theta$. The operation of the expression (18) may be performed by a processor 13 provided within the linear encoder 12. Specifically, the detection phases from the sensors A and B are supplied to the processor 13 which previously stores a known physical amount in its RAM or the like, and the processor 13 performs operation according to the expression (18) to output the results. It is also possible to output the detection signals from the sensors A and B to an external processing unit (such as a personal computer) which may then perform operation according to the expression (18).

Thus, the linear scale type measuring device according to the foregoing embodiment, which performs a predetermined operation (an operation which execute the expression (18) based on the detection values), enables accurate position detection even when the linear encoder is inclined. This can eliminates the conventional structure having 2n−1 scales for n scales or a separate angle sensor.

Although two sensors which are previously inclined by an angle $\theta$ are disposed with respect to one scale in the foregoing embodiment, it is also possible to set the intervals of the detection elements for each of the two sensors at different values whose difference corresponds to that when the linear encoder is inclined by the angle $\theta$.

Further, it is needless to say that, since the foregoing embodiment assumes $\theta>>\delta$, a change in inclination (moire angle) at the actual measurement should preferably be minimized.

As described above, according to the present invention, a moire error can be easily eliminated to perform accurate measurement without the need for providing 2n−1 scales for n scales or for providing a separate angle sensor for detecting the moire angle.

While the preferred embodiment of the present invention has been described using specific terms, such description is for illustrative purposes only, and it is to be understood that changes and variations may be made without departing from the spirit or scope of the appended claims.

What is claimed is:

1. A linear scale measuring device comprising:
   a pair of scales;
   a linear encoder disposed relative to said pair of scales; and
   an operation unit for detecting the position of said linear encoder relative to said pair of scales based on an output from said linear encoder,
   wherein said linear encoder includes two sensors with regard to each of said pair of scales, the sensors being previously arranged such that they are inclined at a known angle with respect to the measuring direction of said scales, and
   wherein said operation unit detects the position of said linear encoder resulting from the inclination of the sensors with regard to the measuring direction of the scales, based on detection signals from the sensors and said known angle which is previously set, by calculating a detection phase of said linear encoder relative to a scale according to $$\Phi_O=(\Phi_{A\delta}+\Phi_{B\delta})/2-2\pi/\lambda\cdot L\{\sin\theta+(\Phi_{AO}-\Phi_{BO}-\Phi_{A\delta}+\Phi_{B\delta})/4\pi\sin\theta\cdot\cos\theta\}, \text{ and}$$

wherein the phases detected by said two sensors are $\Phi_{A\delta}$, and $\Phi_{B\delta}$, respectively, the initial phases of the two sensors are $\Phi_{AO}$, and $\Phi_{BO}$, respectively, said predetermined angle is $\theta$, a wavelength of said scale is $\lambda$, and a distance between the rotation center of the sensors and the center point between the two sensors when the sensors are inclined relative to the scale by the predetermined angle $\theta$ is L.

2. A method of detecting a position using a linear scale type measuring device comprising a pair of scales and a linear encoder, the method comprising the steps of:

(a) inclining two sensors arranged collinearly within said linear encoder at a predetermined angle with respect to each of said pair of scales;

(b) detecting a phase of each of said sensors using said sensors relative to a scale; and (c) calculating a detection phase of said linear encoder relative to a scale based on the detected phases, said predetermined angle, and initial phases of said sensors, the detection phase of said linear encoder relative to a scale being calculated by $$\Phi_O = (\Phi_{A\delta} + \Phi_{B\delta})/2 - 2\pi/\lambda \cdot L \ \{\sin\theta + (\Phi_{AO} - \Phi_{BO} - \Phi_{A\delta} + \Phi_{B\delta})/4\pi\sin\theta \cdot \cos\theta\},$$

wherein the phases detected by said two sensors are $\Phi_{A\delta}$ and $\Phi_{B\delta}$, respectively, the initial phases of the two sensors are $\Phi_{AO}$, and $\Phi_{BO}$, respectively, said predetermined angle is $\theta$, a wavelength of said scale is $\lambda$, and a distance between the rotation center of the sensors and the center point between the two sensors when the sensors are inclined relative to the scale by the predetermined angle $\theta$ is L.

3. A method according to claim 2, wherein each of said sensors comprises a plurality of sensor elements, and in step (b), the phase of each sensor is detected based on detection signals from said plurality of sensor elements.

* * * * *